United States Patent [19] [11] 4,135,204
Davis, Jr. et al. [45] Jan. 16, 1979

[54] AUTOMATIC GLASS BLOWING APPARATUS AND METHOD

[75] Inventors: Ray E. Davis, Jr., Black River; Richard J. Becker, Watertown; Robert G. Foster, Brownville, all of N.Y.; Michael J. Westkamper, Clinton, Conn.

[73] Assignee: Chesebrough-Pond's Inc., Greenwich, Conn.

[21] Appl. No.: 804,905

[22] Filed: Jun. 9, 1977

[51] Int. Cl.² ............................ C03B 9/00; H04N 7/18
[52] U.S. Cl. ...................................... 358/101; 65/161; 65/DIG. 13; 364/468
[58] Field of Search ................... 65/DIG. 9, DIG. 13, 65/158, 161; 364/468, 473, 469, 118, 200, 900; 358/101, 107, 106; 235/92 PD

[56] References Cited
U.S. PATENT DOCUMENTS

| 3,243,509 | 3/1966 | Stut | 358/107 |
| 3,486,875 | 12/1969 | Pymm | 65/161 |
| 3,621,213 | 11/1971 | Jen et al. | 364/468 |
| 3,877,915 | 4/1975 | Mylchreest et al. | 65/DIG. 13 |
| 4,064,534 | 12/1977 | Chen et al. | 358/107 |

Primary Examiner—Robert L. Griffin
Assistant Examiner—Joseph A. Orsino, Jr.
Attorney, Agent, or Firm—Morgan, Finnegan, Pine, Foley & Lee

[57] ABSTRACT

An automatic process controller and method for automatically controlling in real time the formation of an object having boundaries which change with time. A TV camera provides a video image of the object. An interface circuit detects first and second boundaries of the object by analyzing the analog video signal and generates first and second digital numbers corresponding to the first and second boundaries. A programmable digital processor determines the maximum difference between the first and second digital numbers, compares that difference with a target object size and produces a control signal based on the comparison for controlling the continued formation of the object.

9 Claims, 4 Drawing Figures

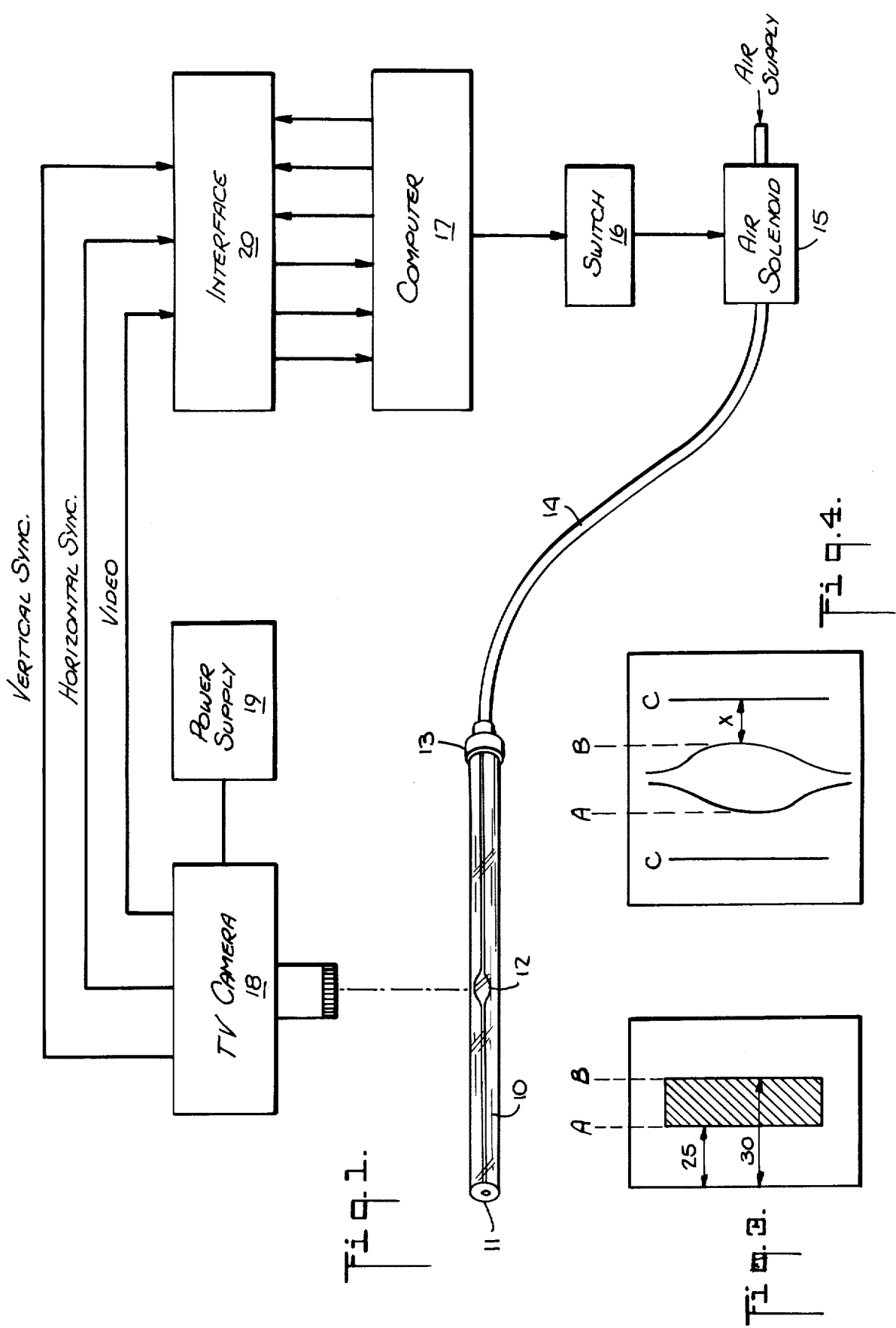

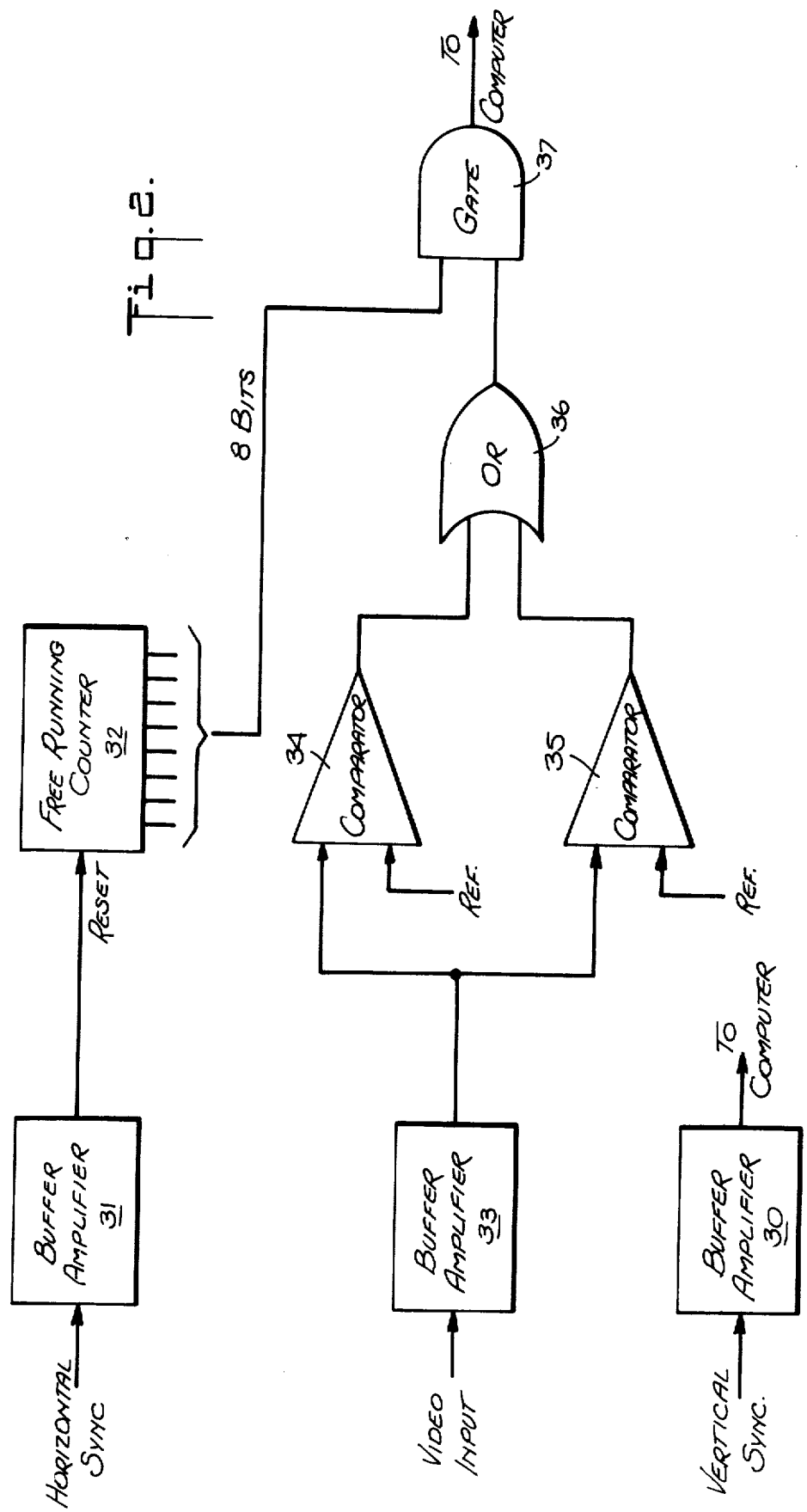

AUTOMATIC GLASS BLOWING APPARATUS AND METHOD

BACKGROUND AND BRIEF DESCRIPTION OF THE INVENTION

The present invention relates to an automatic process controller and method employing a closed circuit TV camera to monitor the progress of the process. More particularly, in the exemplary embodiment disclosed herein, the present invention relates to a real time automatic process for forming end-opening blisters during the manufacture of thermometers.

In the manufacture of thermometers, a glass rod is cut to a size somewhat greater than the length of two thermometers. The glass rod is then heated and a large blister is blown approximately in the center of the rod using compressed air. After the rod has cooled the rod is cut in half through the center of the blister. In this way the large end opening is formed in the thermometer. A bulb is fastened to the end opening to seal that end and the thermometer is filled with mercury. After degassification of the mercury, the thermometer is calibrated, the excess mercury removed and the other end sealed.

One of the more critical steps in the manufacture of a thermometer involves the forming of the large or end-opening blister. Traditionally, this blister has been blown by an operator while observing an optically magnified image of the blister and controlling the compressed air supply by, for example, using a foot-operated treadle. Although most operators had fairly good eye-foot coordination, the defect rate for thermometers due to unsatisfactory end opening blisters was undesirably high. This was due in part to the fact that there are tremendous variations, even within the same lot of glass, in how readily the blister can be blown. These differences result from differences in the thicknesses of the glass rods as well as differences in the bore diameters thereof. Moreover, movements in the manufacturing area can cause drafts which vary the flames being used to heat the glass rods prior to forming the end opening blisters therein.

One of the complicating factors associated with blowing the large or end-opening blisters is the phenomenon of "coast" or "drift". Even though the end-opening blister is blown in the glass rod after it has been removed from the heat and has started to cool, the blister does not stop growing immediately after the compressed air is turned off. Rather, the blister continues to expand or "coast". Moreover, the rate and extent of coast varies significantly from piece of glass to piece of glass, even within a single batch. Accordingly, even with the best of eye-foot coordination it was impossible for an operator to predict the amount of coast to be expected with a given piece of glass. Hence, the undesirably high rejection rate due to unsatisfactory end opening blisters.

The present invention solves the problems associated with blowing end-opening blisters in thermometers. In accordance with the present invention, a closed circuit TV camera is focused on a magnified optical image of the blister. The analog video information is analyzed to detect the leading and trailing edges of the blisters. Digital numbers corresponding to the leading and trailing edges are produced and fed to a computer where they are analyzed and process control signals are developed based thereon.

More particularly, the digital numbers are analyzed to determine the actual size of the blister. In addition, the "coast" associated with the blister is calculated. The difference between the desired blister size and the actual blister size is determined and the "coast" substracted therefrom. A sufficient quantity of compressed air is then supplied to the rod to cause the blister to grow to one-half of the difference between the desired size and the actual size, minus the "coast". The air is then turned off, the edges of the new blister determined and a new "coast" calculated. The difference between the desired blister size and the new blister size is again computed and the new "coast" subtracted therefrom. Enough compressed air is supplied to the blister to cause it to grow by one-half of the remaining distance, minus the new coast.

The above-described iterative process is repeated many times a second. In this manner uniform end-opening blisters are formed and the rejection rate due to improper end-opening blisters is greatly diminished.

While the particular embodiment of the invention is disclosed in connection with the formation of end-opening blisters in thermometers, it will be appreciated by those skilled in the art that the automatic process controller of the present invention has wide application. It may be used, for example, to control the size of a workpiece being turned on a lathe. Broadly, the present invention can make either relative or absolute comparisons between static shapes or between objects of varying size and their actual location versus their desired location, the only requirement being that the object be susceptible to view by a TV camera.

BRIEF DESCRIPTION OF THE DRAWINGS

The present invention is disclosed in conjunction with the following drawings which form a part of the specification and wherein:

FIG. 1 is a functional block diagram of one embodiment of the present invention;

FIG. 2 is a functional block diagram of a video/computer interface for use with the embodiment of FIG. 1;

FIG. 3 is an idealized representation of a TV image in accordance with the embodiment of FIG. 1; and FIG. 4 is a pictorial representation of a TV image in accordance with the embodiment of FIG. 1.

DETAILED DESCRIPTION

Referring now to FIG. 1, there is set forth a functional block diagram of one embodiment of the present invention. A glass rod 10, which has previously been heated, has a bore 11 therein. An end-opening blister 12 is shown being formed therein. Attached to one end of rod 10 is a cap 13 which is connected to air solenoid 15 by a tube 14. Air solenoid 15 is connected to an air supply which may, for example, be maintained at a pressure of 90 p.s.i.g. A switch 16, which is preferably of the solid-state type, controls the operation of air solenoid 15. Switch 16 in turn is controlled by the output from computer 17 which may, for example, be an Intel 80/10 single board programmable digital computer.

TV camera 18 is focused on an optically enlarged image of end-opening blister 12. The optics are conventional and are not shown for purposes of simplicity. TV camera 18 has a power supply 19 associated therewith for supplying power thereto. TV camera 18 is preferably a solid state TV camera of the charge injection device or charge coupled device type. TV camera 18 may, for example, be a type TV 2000 manufactured by General Electric Company which has a 244 by 188 element array. TV camera 18 may also be a type TN 2200 manufactured by General Electric Company which has a 128 by 128 element array. The particular camera selected will depend on the resolution required for satisfactory process control.

TV camera 18 produces a video image in the form of an analog video signal, together with horizontal and vertical sync signals. These outputs are fed to interface 20 which interfaces the analog signals produced by TV camera 18 with digital computer 17.

Referring now to FIG. 2, there is shown a functional block diagram of interface 20. The vertical sync signal is received by buffer amplifier 30 which performs an impedance matching function and changes −0.3 to +1.5 volt vertical sync signal to a 0 to +5 volt signal compatible with TTL logic circuitry. The output of buffer amplifier 30 is fed to the computer and indicates the start of the raster.

The horizontal sync signal is received by buffer amplifier 31 which, like buffer amplifier 30, performs impedance matching and logic level changing functions. The output of buffer amplifier 31 is used to reset free running counter 32. Counter 32 may, for example, run at a frequency of five megahertz. Counter 32 preferably produces an 8-bit digital count which is fed to one input of gate 37.

The analog video signal is fed to buffer amplifier 33 which performs automatic gain control and impedance matching functions. The output of buffer amplifier 33 is fed to one input each of comparators 34 and 35. In addition, the other inputs of comparators 34 and 35 are connected respectively to different reference voltages. Comparator 34 senses when the analog video signal exceeds a predetermined level (the leading edge of the blister) and comparator 35 senses when the analog video signal drops below a predetermined level (the trailing edge of the blister).

The outputs of comparators 34 and 35 are fed to the inputs of OR gate 36. The output of OR gate 36 is fed to the other input of gate 37. Thus, when the analog video signal exceeds a predetermined level, comparator 34 produces an output which is fed by OR gate 36 to gate 37. The count at the output of counter 32 is then gated to the computer. When the analog video signal falls below a predetermined level, comparator 35 produces an output which is fed by OR gate 36 to gate 37. The count now present at the output of counter 32 is also fed to the computer.

It has been found that it is not necessary to utilize every horizontal line of video and that excellent results are obtained using every other line.

Referring now to FIG. 3, there is shown an idealized representation of a TV image. The dark area represents blister 12 shown in FIG. 1. To control the process of generating blister 12 it is necessary to determine the limits of blister 12 at various times during its growth. The leading edge of blister 12 is designated by the letter "A" and the trailing edge by the letter "B".

The leading edge of the blister is sensed by comparator 34. In the idealized representation of FIG. 3, the leading edge A is designated by the number 25, that being the count present at the output of counter 32 when comparator 34 sensed the leading edge. Similarly, the trailing edge B is designated by the number 30, that being the count present at the output of counter 32 when comparator 35 sensed the trailing edge. In this way, two 8-bit digital numbers are generated for each line of analog video information, the digital numbers corresponding, respectively, to the leading and trailing edges of blister 12.

Referring now to FIG. 4, there is shown a pictorial representation of a TV image of a blister. It is immediately apparent that blister 12 lacks the symmetry of the idealized representation shown in FIG. 3. It is also apparent that the maximum extent of the leading edge A and the maximum extent of the trailing edge B do not necessarily occur in the same horizontal line. Therefore, it is necessary to determine the minimum value of the numbers corresponding to the leading edge A and to determine the maximum value of the numbers corresponding to the trailing edge B. The difference between minimum A and maximum B determines the extent of the blister. This difference is then compared with the desired size, indicated by the lines C—C in FIG. 4, to determine how much, if any, the size of the blister should be increased so as to attain the desired or target size.

As brought out earlier, one of the complicating factors in generating a blister is the phenomenon of drift or "coast", i.e., the tendency of the blister to continue to grow after the air supply has been turned off. To accurately control the size of the blister it is necessary to calculate the "coast" at various points in time and employ this figure directly in the automatic control of the process.

Thus, at the beginning of the process the air is turned on until the edges A and B can be reliably determined. At that point in time the air is turned off and initial minimum A, maximum B and max/A-B/ are determined. The blister is allowed to coast to a stop. Then second minimum A, maximum B and max/A-B/ are determined. In addition, the "coast" is calculated by subtracting the initial max/A-B/ from the second max/A-B/. From the desired size C—C are subtracted the second max/A-B/ and the "coast".

One half of the resultant figure is taken as the target and enough compressed air is fed to rod 10 to cause blister 12 to grow to that target size. At that point the air is turned off again and new minimum A, maximum B, max/A-B/ and a new "coast" are determined. The new max/A-B/ and the new "coast" are subtracted from the desired size C—C and one half of that new value is taken as the new target. Sufficient compressed air is fed to rod 10 to cause blister 12 to grow to that new target size. This process is repeated many times a second to ensure a controlled, accurate growth of the blister over the several seconds required to generate the blister.

As noted earlier, computer 17 may, for example, be an Intel 80/10 single board programmable digital computer. One program for carrying out the preferred embodiment of the invention using such a computer is set forth below.

```
0001         ONE      EQU    0001H              ;ONE
0000         ZERO     EQU    0000H              ;ZERO
00E4         IOPE4    EQU    00E4H              ;PORT E4
00E5         IOPE5    EQU    00E5H              ;PORT E5
00E6         IOPE6    EQU    00E6H              ;PORT E6
00E7         IOPE7    EQU    00E7H              ;PORT E7
00E8         IOPE8    EQU    00E8H              ;PORT E8
00E9         IOPE9    EQU    00E9H              ;PORT E9
00EA         IOPEA    EQU    00EAH              ;PORT EA
00EB         IOPEB    EQU    00EBH              ;PORT EB
00EC         IOPEC    EQU    00ECH              ;PORT EC
00ED         IOPED    EQU    00EDH              ;PORT ED
00EE         IOPEE    EQU    00EEH              ;PORT EE
00EF         IOPEF    EQU    00EFH              ;PORT EF
00E7         IOPC1    EQU    IOPE7              ;CONTROL PORT 1
00EB         IOPC2    EQU    IOPEB              ;CONTROL PORT 2
00ED         IOPC3    EQU    IOPED              ;CONTROL PORT 3 (SERIAL)
0000         RST0     EQU    0000H              ;RESTART 0 ADDR
0008         RST1     EQU    0008H              ;RESTART 1 ADDR
0010         RST2     EQU    0010H              ;RESTART 2 ADDR
0018         RST3     EQU    0018H              ;RESTART 3 ADDR
0020         RST4     EQU    0020H              ;RESTART 4 ADDR
0028         RST5     EQU    0028H              ;RESTART 5 ADDR
0030         RST6     EQU    0030H              ;RESTART 6 ADDR
0038         RST7     EQU    0038H              ;RESTART 7 ADDR
0000         RESTA    EQU    0000H              ;RESTART 0/POWER ON ADDR
0001         LITE0    EQU    00000001B          ;LITE 0 MASK
0002         LITE1    EQU    00000010B          ;LITE 1 MASK
0004         LITE2    EQU    00000100B          ;LITE 2 MASK
0008         LITE3    EQU    00001000B          ;LITE 3 MASK
0010         LITE4    EQU    00010000B          ;LITE 4 MASK
0020         LITE5    EQU    00100000B          ;LITE 5 MASK
0040         LITE6    EQU    01000000B          ;LITE 6 MASK
0080         LITE7    EQU    10000000B          ;LITE 7 MASK
0001         SW1      EQU    00000001B          ;SW 1 MASK
0002         SW2      EQU    00000010B          ;SW 2 MASK
0004         SW3      EQU    00000100B          ;SW 3 MASK
0008         SW4      EQU    00001000B          ;SW 4 MASK
0010         SW5      EQU    00010000B          ;SW 5 MASK
0020         SW6      EQU    00100000B          ;SW 6 MASK
0040         SW7      EQU    01000000B          ;SW 7 MASK
0080         SW8      EQU    10000000B          ;SW 8 MASK
00FF         ALLSW    EQU    11111111B          ;ALL SWITCH MASK
00FF         ANYSW    EQU    11111111B          ;ANY SWITCH MASK
00ED         CNIOP    EQU    IOPED              ;CONSOLE PORT
00CF         CNMDW    EQU    11001111B          ;CONSOLE MODE WORD
0027         CNCTW    EQU    00100111B          ;CONSOLE COMMAND WORD
00EC         COIOP    EQU    IOPEC              ;CONSOLE OUTPUT PORT
00EE         CIIOP    EQU    IOPEE              ;CONSOLE INPUT PORT
0001         CNRDY    EQU    00000001B          ;TEST FOR READY MASK
0002         CNBRB    EQU    00000010B          ;READ BUFFER STATUS MASK
00EB         LTIOP    EQU    IOPEB              ;STATUS LITES CONTROL PORT
00E9         LOIOP    EQU    IOPE9              ;LITE PORT
0080         LTMDW    EQU    10000000B          ;LITE PORT CONTROL WORD
000D         CR       EQU    0DH                ;ASCII CARRIAGE RETURN
000A         LF       EQU    0AH                ;ASCII LINE FEED
007F         PTYM     EQU    01111111B          ;MASK FOR PARITY
3FFF         NDRAM    EQU    03FFFH             ;END OF USER RAM
3C00         STRAM    EQU    03C00H             ;START OF USER RAM
0000         CUADD    SET    ZERO               ;TRACING RAM USAGE
3C00         CURAM    SET    STRAM              ;TRACING RAM USAGE
0040         BGNSU    EQU    0040H              ;BEGIN OF SUPV ADDR
             SAVE     MACRO
             ;        SAVE   SBC-80/10 MACRO V. M=1.0
                      PUSH   PSW                ;SAVE A/FLAGS
                      PUSH   B                  ;SAVE B/C
                      PUSH   D                  ;SAVE D/E
                      PUSH   H                  ;SAVE H/L
                      ENDM
             SETIT    MACRO  VALUE
             ;        SETIT  SBC-80/10 MACRO V. M=1.0
             TIME     SET    VALUE
                      DI                        ;DISABLE INTERRUPTS
                      PUSH   H                  ;SAVE H/L
                      LXI    H,TIME             ;LOAD TIMER VALUE
```

```
                SHLD    XINTU           ;SET TIMER
                POP     H               ;RESTORE H/L
                EI                      ;ENABLE INTERRUPTS
                ENDM
IFIT    MACRO   VALUE,ADDR
;       IFIT    SBC-80/10 MACRO V. M=1.0
TIME    SET     65536-VALUE
        DI                              ;DISABLE INTERRUPTS
        LHLD    XINTU                   ;LOAD TIMER
        LXI     B,TIME                  ;LOAD COMPL OF VALUE
        DAD     B                       ;ADD(SUBTRACT) VALUE
        EI                              ;ENABLE INTERRUPTS
        JC      ADDR                    ;JUMP IF TIME LAPSED
        ENDM
SETSS   MACRO
;       SETSS   SBC-80/10 MACRO V. M=1.0
        SAVE
        LXI     H,0                     ;ZERO H/L
        DAD     SP                      ;PUT SP INTO H/L
        SHLD    XSPSV                   ;SAVE CURRENT STACK POINTER
        ENDM
RSTSS   MACRO
;       RSTSS   SBC-80/10 MACRO V. M=1.0
        LHLD    XSPSV                   ;LOAD SAVED STACK POINTER
        SPHL                            ;PUT IN STACK POINTER
        REST
        ENDM
STXIT   MACRO   ADDR,ELTM
;       STXIT   SBC-80/10 MACRO V. M=1.0
TIME    SET     65536-ELTM
        DI                              ;DISABLE INTERRUPTS
        SETSS
        LXI     H,ADDR                  ;LOAD STXIT JMP ADDR
        SHLD    XITLA                   ;STORE IN SUPERVISOR
        LXI     H,TIME                  ;LOAD COMPL OF TIME
        SHLD    XRTCT                   ;STORE IN TIMER
        EI                              ;ENABLE INTERRUPTS
        ENDM
WAIT    MACRO   ELTM
;       WAIT    SBC-80/10 MACRO V. M=1.0
TIME    SET     65536-ELTM
        DI                              ;DISABLE INTERRUPTS
        LXI     H,IDONE                 ;ADDR OF END OF WAIT
        SHLD    XITLA                   ;STORE IN SUPV
        LXI     H,TIME                  ;LOAD ELTM COMP
        SHLD    XRTCT                   ;STORE IN TIMER
        SON     LITE1                   ;TURN ON WAIT LITE
        EI                              ;ENABLE INTERRUPTS
IWAIT:  HLT                             ;HALT CPU
        JMP     IWAIT                   ;WAIT LOOP
IDONE:  SOFF    LITE1                   ;TUNE OFF WAIT LITE
        INX     SP                      ;BUMP SP
        INX     SP                      ;PAST STXIT RTN ADDR
        REST                            ;RESTORE REGS
        INX     SP                      ;BUMP SP
        INX     SP                      ;PAST INTER ADDR
        ENDM
RETIT   MACRO
;       RETIT   SBC-80/10 MACRO V. M=1.0
        RET                             ;RETURN TO INTER POINT
        ENDM
STIT    MACRO   ADDR
;       STIT    SBC-80/10 MACRO V. M=1.0
        LHLD    XINTU                   ;LOAD CURRENT TIMER VALUE
        SHLD    ADDR                    ;STORE FOR CALLER
        ENDM
ENDIT   MACRO
;       ENDIT   SBC-80/10 MACRO V. M=1.0
        DI                              ;DISABLE ANY INTERRUPTS
        RSTSS                           ;RESTORE SYSTEM STATUS
        ENDM
HALT    MACRO
;       HALT    SBC-80/10 MACRO V. M=1.0
        SON     LITE1                   ;TURN ON WAIT LITE
        HLT                             ;HALT PROCESSOR
```

```
                    SOFF    LITE1              ;TURN OFF WAIT LITE
                    ENDM
            REST    MACRO
                    REST    SBC-80/10 MACRO V. M=1.0
                    POP     H                  ;RESTORE H/L
                    POP     D                  ;RESTORE D/E
                    POP     B                  ;RESTORE B/C
                    POP     PSW                ;RESTORE A/FLAGS
                    ENDM
            SON     MACRO LITE
        ;           SON     SBC-80/10 MACRO V. M=1.0
                    LDA     XLTST              ;CURRENT LITE STATUS
                    ORI     LITE               ;SET ON PROPER BIT
                    STA     XLTST              ;STORE NEW STATUS
                    OUT     LOIOP              ;SET THE LITE ON
                    ENDM
            SOFF    MACRO LITE
                    LDA     XLTST              ;CURRENT LITE STATUS
                    ORI     LITE               ;INSURE BIT ON
                    XRI     LITE               ;TURN OFF PROPER BIT
                    STA     XLTST              ;STORE NEW STATUS
                    OUT     LOIOP              ;SET THE LITE OFF
                    ENDM
            SETSW   MACRO   SWTCH
        ;           SETSW   SBC-80/10 MACRO V. M=1.0
                    LDA     XSWCH              ;LOAD SWITCH BLOCK
                    ORI     SWTCH              ;TURN BIT ON
                    STA     XSWCH              ;RESTORE SWITCH BLOCK
                    ENDM
            RESSW   MACRO   SWTCH
        ;           RESSW   SBC-80/10 MACRO V. M=1.0
                    LDA     XSWCH              ;LOAD SWITCH BLOCK
                    ORI     SWTCH              ;INSURE ON
                    XRI     SWTCH              ;COMPLIMENT
                    STA     XSWCH              ;RESTORE SWITCH BLOCK
                    ENDM
            IFSW    MACRO   SWTCH, ADDR
        ;           IFSW    SBC-80/10 MACRO V. M=1.0
                    LDA     XSWCH              ;LOAD SWITCH BLOCK
                    ANI     SWTCH              ;MASK TO PROPER BIT
                    JNZ     ADDR               ;JUMP IF ON
                    ENDM
            MOVEB   MACRO   ADDR1, ADDR2
        ;           MOVEB   SBC-80/10 MACRO V. M=1.0
                    LDA     ADDR1              ;LOAD BYTE INTO A
                    STA     ADDR2              ;STORE BYTE IN MEM
                    ENDM
            IFBEQ   MACRO   AOPER, BOPER, EQADDR
        ;           IFBEQ   SBC-80/10 MACRO V. M=1.0
                    LDA     AOPER              ;LOAD BYTE INTO A
                    MOV     B, A               ;MOVE IT TO B
                    LDA     BOPER              ;LOAD YTE INTO A
                    XRA     B                  ;COMPLIMENT BITS
                    JZ      EQADDR             ;JUMP IF EQUAL
                    ENDM
            IFBGT   MACRO   AOPER, BOPER, GTADDR
        ;           IFBGT   SBC-80/10 MACRO V. M=1.0
                    LDA     BOPER              ;LOAD BOPER INTO A
                    MOV     B, A               ;MOVE IT TO B
                    LDA     AOPER              ;LOAD AOPER INTO A
                    CMP     B                  ;TEST A VS B
                    JNC     GTADDR             ;JUMP IF A GT B
                    ENDM
            IFBLT   MACRO   AOPER, BOPER, LTADDR
        ;           IFBLT   SBC-80/10 MACRO V. M=1.0
                    LDA     BOPER              ;LOAD BOPER INTO A
                    MOV     B, A               ;MOVE IT TO B
                    LDA     AOPER              ;LOAD AOPER INTO A
                    CMP     B                  ;TEST A VS B
                    JC      LTADDR             ;JUMP IF A LT B
                    ENDM
            ADDB    MACRO   AOPER, BOPER, COPER
        ;           ADDB    SBC-80/10 MACRO V. M=1.0
```

```
                        LDA     AOPER           ;LOAD AOPER INTO A
                        MOV     B,A             ;MOVE IT TO B
                        LDA     BOPER           ;LOAD BOPER INTO A
                        ADD     B               ;ADD A+B
                        STA     COPER           ;STORE RESULT
                        ENDM
              SUBB      MACRO   AOPER,BOPER,COPER
           ;            SUBB    SBC-80/10 MACRO V. M=1.0
                        LDA     BOPER           ;LOAD BOPER INTO A
                        MOV     B,A             ;MOVE IT TO B
                        LDA     AOPER           ;LOAD AOPER INTO A
                        SUB     B               ;SUB A-B
                        STA     COPER           ;STORE RESULT
                        ENDM
           ;
           ;            ***** BASIC SBC-80/10 SUPERVISOR *****
           ;
 0000                   ORG     RESTA           ;LOCATION ZERO
           START:
 0000 F3                DI                      ;DISABLE ANY INTERRUPTS
 0001 C34E00            JMP     XINIT           ;GO INITIALIZE SYSTEM
 0008         XI1:      ORG     RST1            ;RST1 CODE
 0008 C34200            JMP     XERRO           ;ERROR STOP
 0010         XI2:      ORG     RST2            ;RST2 CODE
 0010 C34200            JMP     XERRO           ;ERROR STOP
 0018         XI3:      ORG     RST3            ;RST3 CODE
 0018 C34200            JMP     XERRO           ;ERROR STOP
 0020         XI4:      ORG     RST4            ;RST4 CODE
 0020 C34200            JMP     XERRO           ;ERROR STOP
 0028         XI5:      ORG     RST5            ;RST5 CODE
 0028 C34200            JMP     XERRO           ;ERROR STOP
 0030         XI6:      ORG     RST6            ;RST6 CODE
 0030 C34200            JMP     XERRO           ;ERROR STOP
 0038         XI7:      ORG     RST7            ;RST7 CODE
 0038 C36C00            JMP     XITCP           ;INTERVAL TIMER RTN
 0040         XSUBG:    ORG     BGNSU           ;START OF SUPERVISOR
 0040 0105    XPGIDA:   DW      PGMID           ;ADDR OF PROG ID
              XERRO:                            ;ERROR STOP
 0042 F3                DI                      ;DISABLE INTERRUPTS
           +            SON     LITE0           ;SET ON LITE 0
           +;           SON     SBC-80/10 MACRO V. M=1.0
 0043 3A0A3C +          LDA     XLTST           ;CURRENT LITE STATUS
 0046 F601   +          ORI     00001H          ;SET ON PROPER BIT
 0048 320A3C +          STA     XLTST           ;STORE NEW STATUS
 004B D3E9   +          OUT     LOIOP           ;SET THE LITE ON
 004D 76                HLT                     ;HALT PROCESSOR
           XINIT:                               ;SYSTEM INITIALIZATIOLT
 004E 31FF3F            LXI     SP,NDRAM        ;SET SP TO END OF RAM
 0051 3ECF              MVI     A,CNMDW         ;A=USTART MODE
 0053 D3ED              OUT     CNIOP           ;SET USTART MODE
 0055 3E27              MVI     A,CNCTW         ;A=USTART COMMAND
 0057 D3ED              OUT     CNIOP           ;START USTART
 0059 3E80              MVI     A,LTMDW         ;A=SYSTEM LITES MODE
 005B D3EB              OUT     LTIOP           ;SET UP LITE PORT
           +            SOFF    LITE1           ;SET OFF WAIT LITE
 005D 3A0A3C +          LDA     XLTST           ;CURRENT LITE STATUS
 0060 F602   +          ORI     00002H          ;INSURE BIT ON
 0062 EE02   +          XRI     00002H          ;TURN OFF PROPER BIT
 0064 320A3C +          STA     XLTST           ;STORE NEW STATUS
 0067 D3E9   +          OUT     LOIOP           ;SET THE LITE OFF
 0069 C3E800            JMP     XRUN            ;GO TO USER CODE
              XITCP:                            ;INTERVAL TIMER SERVICE RTN
           +            SAVE
           +;           SAVE    SBC-80/10 MACRO V. M=1.0
 006C F5     +          PUSH    PSW             ;SAVE A/FLAGS
 006D C5     +          PUSH    B               ;SAVE B/C
 006E D5     +          PUSH    D               ;SAVE D/E
```

```
006F E5          +           PUSH   H                ; SAVE H/L
0070 37                      STC                     ; SET CARRY BIT
0071 3F                      CMC                     ; INSURE RESET
0072 010100                  LXI    B,1              ; LOAD B/C WITH 1
0075 2A023C                  LHLD   XINTU            ; LOAD INTERVAL TIMER
0078 09                      DAD    B                ; ADD 1
0079 22023C                  SHLD   XINTU            ; STORE BACK
007C 2A003C                  LHLD   XRTCT            ; LOAD TIMER
007F 09                      DAD    B                ; TIMER + 1
0080 DA8C00                  JC     XITEX            ; TIMER OVERFLOW
0083 22003C                  SHLD   XRTCT            ; STORE TIMER
                 +           REST
                 +;          REST   SBC-80/10 MACRO V. M=1.0
0086 E1          +           POP    H                ; RESTORE H/L
0087 D1          +           POP    D                ; RESTORE D/E
0088 C1          +           POP    B                ; RESTORE B/C
0089 F1          +           POP    PSW              ; RESTORE A/FLAGS

008A FB                      EI                      ; ENABLE INTERRUPTS
008B C9                      RET                     ; RETURN
         XITEX:                                      ; SET GO TO STXIT ADDR
008C 219400                  LXI    H,XITER          ; LOAD ADDR OF RETURN
008F E5                      PUSH   H                ; PUT IN STACK
0090 2A063C                  LHLD   XITLA            ; LOAD STXIT ADDR
0093 E9                      PCHL                    ; GO THERE
         XITER:                                      ; STXIT RETURN
                 +           REST
                 +;          REST   SBC-80/10 MACRO V. M=1.0
0094 E1          +           POP    H                ; RESTORE H/L
0095 D1          +           POP    D                ; RESTORE D/E
0096 C1          +           POP    B                ; RESTORE B/C
0097 F1          +           POP    PSW              ; RESTORE A/FLAGS

0098 C9                      RET                     ; RETURN
         XCO:                                        ; CONSOLE OUTPUT SERVICE RTN
0099 DBED                    IN     CNIOP            ; READ STATUS
009B E601                    ANI    CNRDY            ; CONSOLE READY
009D CA9900                  JZ     XCO              ; NOT YET
00A0 79                      MOV    A,C              ; PUT CHAR IN A
00A1 D3EC                    OUT    COIOP            ; WRITE IT
00A3 C9                      RET                     ; RETURN
         XTCN:                                       ; TEST CONSOLE STATUS
00A4 DBED                    IN     CNIOP            ; READ STATUS PORT
00A6 37                      STC                     ; SET CARRY BIT
00A7 3F                      CMC                     ; RESET CARRY BIT
00A8 E601                    ANI    CNRDY            ; AND STATUS
00AA C0                      RNZ                     ; CONSOLE READY
00AB 37                      STC                     ; SET CARRY BIT
00AC C9                      RET                     ; RETURN

XPMCO:                                      ; PRINT ON CONSOLE RTN
00AD 4E                      MOV    C,M              ; MOVE BYTE TO C
00AE CD9900                  CALL   XCO              ; GO PUT
00B1 23                      INX    H                ; BUMP ADDRESS
00B2 05                      DCR    B                ; LENGTH=LENGTH-1
00B3 C2AD00                  JNZ    XPMCO            ; CONTINUE IF NOT ZERO
00B6 C9                      RET                     ; RETURN
         XCI:                                        ; CONSOLE INPUT SERVICE RTN
00B7 DBED                    IN     CNIOP            ; READ STATUS
00B9 E602                    ANI    CNBRD            ; DATA READY
00BB CAB700                  JZ     XCI
00BE DBEE                    IN     CIIOP            ; READ DATA
00C0 E67F                    ANI    PTYM             ; MASK OFF PARITY BITS
00C2 C9                      RET                     ; RETURN
         XRMCI:                                      ; READ A MESSAGE UNTIL CR
00C3 0E3F                    MVI    C,'?'            ; PUT A ? ON DEV
00C5 CD9900                  CALL   XCO              ; PRINT IT
00C8 0E07                    MVI    C,07H            ; RING BELL TO DEV
00CA CD9900                  CALL   XCO              ; GO RING CHIMES
00CD 0600                    MVI    B,0              ; B=0, MSG LENGTH
         XRMCL:                                      ; LOAD MESSAGE TILL CR
00CF CDB700                  CALL   XCI              ; GET A BYTE
00D2 4F                      MOV    C,A              ; PUT IT IN C
```

```
00D3 CD9900             CALL    XCO             ;ECHO IT
00D6 79                 MOV     A,C             ;PUT BYTE BACK IN A
00D7 FE0D               CPI     CR              ;WAS IT A CR
00D9 CAE200             JZ      XRMCD           ;YES
00DC 77                 MOV     M,A             ;STORE BYTE
00DD 23                 INX     H               ;BUMP BUFFER ADDR
00DE 04                 INR     B               ;BUMP LENGTH
00DF C3CF00             JMP     XRMCL           ;GO GET ANOTHER
                XRMCD:                          ;MESSAGE LOADED
00E2 0E0A               MVI     C,LF            ;PUT A LF ON DEV
00E4 CD9900             CALL    XCO
00E7 C9                 RET                     ;RETURN
00E8            CUADD   SET     $
                ;
                ;       SUPERVISOR STORAGE AREAS
                ;
3C00                    ORG     CURAM           ;SET LOC TO RAM ADDR
3C00 0000       XRTCT:  DW      0               ;TIMER
3C02 0000       XINTV:  DW      0               ;INTERVAL TIMER
3C04 0000       XSPSV:  DW      0               ;STACK POINTER SAVE
3C06 0000       XITLA:  DW      0               ;STXIT RTN ADDRX
3C08 0800       XITSR:  DW      RST1            ;TIMER SERV RTN ADDR
3C0A 00         XLTST:  DB      00000000B       ;CURRENT LITE STATUS
3C0B 00         XSWCH:  DB      00000000B       ;SWITCH BLOCK
                ;
                ;       CURAM MUST BE RESET TO $ AFTER EACH USE
                ;
3C0C            CURAM   SET     $
00E8                    ORG     CUADD
                XRUN:
                ;
                ;       **** USER PROGRAM STARTS HERE ****
                ;
                ;       ************************************
                ;       END OPENING PROGRAM V.M=2.0
                ;       ************************************
                ;
                ;       IO PORT DEFINITIONS...
                ;
00E4            ACTS    EQU     IOPE4           ;A COUNTS
00E5            BCTS    EQU     IOPE5           ;B COUNTS
00E6            INDX    EQU     IOPE6           ;MACHINE INDEX
00EA            CAIR    EQU     IOPEA           ;COOLING AIR
00EA            BAIR    EQU     IOPEA           ;BLOWING AIR
00E6            SIOP    EQU     IOPE6           ;STATUS PORT FOR A & B CTS
00E8            LCTP    EQU     IOPE8           ;PORT TO READ MAXPK
                ;
                ;       IO PORT CONTROL WORDS....
                ;
00BE            STBIN   EQU     10111110B       ;A & B COUNTS STROBBED IN
0008            BITSA   EQU     00001000B
0004            BITSB   EQU     00000100B       ;BIT SET B
0091            BIOCW   EQU     10010001B       ;PORTC (EA) L=I,U=O
                                                ;PORTB (E9) 8 BIT INPUT
                                                ;PORTA (E8) 8 BIT OUTPUT
                ;
                ;       SYSTEM INITIALIZATION....
                ;
                ;       OPEN IO PORTS....
                ;
00E8 3EBE               MVI     A,STBIN         ;SET E4-E5 STROBED IN
00EA D3E7               OUT     IOPC1           ;SET IT
00EC 3E08               MVI     A,BITSA         ;SET BITS
00EE D3E7               OUT     IOPC1           ;SET IT
00F0 3E04               MVI     A,BITSB         ;SET BITS
00F2 D3E7               OUT     IOPC1           ;SET IT
00F4 3E91               MVI     A,BIOCW         ;SET EA
00F6 D3EB               OUT     IOPC2           ;SET IT
                ;
                ;       CLEAR STATUS LITES....
```

```
                    +       SOFF    LITE0
        00F8 3A0A3C  +       LDA     XLTST           ;CURRENT LITE STATUS
        00FB F601    +       ORI     00001H          ;INSURE BIT ON
        00FD EE01    +       XRI     00001H          ;TURN OFF PROPER BIT
        00FF 320A3C  +       STA     XLTST           ;STORE NEW STATUS
        0102 D3E9    +       OUT     LOIOP           ;SET THE LITE OFF

+       SOFF    LITE1
        0104 3A0A3C  +       LDA     XLTST           ;CURRENT LITE STATUS
        0107 F602    +       ORI     00002H          ;INSURE BIT ON
        0109 EE02    +       XRI     00002H          ;TURN OFF PROPER BIT
        010B 320A3C  +       STA     XLTST           ;STORE NEW STATUS
        010E D3E9    +       OUT     LOIOP           ;SET THE LITE OFF

+       SOFF    LITE2
        0110 3A0A3C  +       LDA     XLTST           ;CURRENT LITE STATUS
        0113 F604    +       ORI     00004H          ;INSURE BIT ON
        0115 EE04    +       XRI     00004H          ;TURN OFF PROPER BIT
        0117 320A3C  +       STA     XLTST           ;STORE NEW STATUS
        011A D3E9    +       OUT     LOIOP           ;SET THE LITE OFF

+       SOFF    LITE3
        011C 3A0A3C  +       LDA     XLTST           ;CURRENT LITE STATUS
        011F F608    +       ORI     00008H          ;INSURE BIT ON
        0121 EE08    +       XRI     00008H          ;TURN OFF PROPER BIT
        0123 320A3C  +       STA     XLTST           ;STORE NEW STATUS
        0126 D3E9    +       OUT     LOIOP           ;SET THE LITE OFF

+       SOFF    LITE4
        0128 3A0A3C  +       LDA     XLTST           ;CURRENT LITE STATUS
        012B F610    +       ORI     00010H          ;INSURE BIT ON
        012D EE10    +       XRI     00010H          ;TURN OFF PROPER BIT
        012F 320A3C  +       STA     XLTST           ;STORE NEW STATUS
        0132 D3E9    +       OUT     LOIOP           ;SET THE LITE OFF

+       SOFF    LITE5
        0134 3A0A3C  +       LDA     XLTST           ;CURRENT LITE STATUS
        0137 F620    +       ORI     00020H          ;INSURE BIT ON
        0139 EE20    +       XRI     00020H          ;TURN OFF PROPER BIT
        013B 320A3C  +       STA     XLTST           ;STORE NEW STATUS
        013E D3E9    +       OUT     LOIOP           ;SET THE LITE OFF

+       SOFF    LITE6
        0140 3A0A3C  +       LDA     XLTST           ;CURRENT LITE STATUS
        0143 F640    +       ORI     00040H          ;INSURE BIT ON
        0145 EE40    +       XRI     00040H          ;TURN OFF PROPER BIT
        0147 320A3C  +       STA     XLTST           ;STORE NEW STATUS
        014A D3E9    +       OUT     LOIOP           ;SET THE LITE OFF

+       SOFF    LITE7
        014C 3A0A3C  +       LDA     XLTST           ;CURRENT LITE STATUS
        014F F680    +       ORI     00080H          ;INSURE BIT ON
        0151 EE80    +       XRI     00080H          ;TURN OFF PROPER BIT
        0153 320A3C  +       STA     XLTST           ;STORE NEW STATUS
        0156 D3E9    +       OUT     LOIOP           ;SET THE LITE OFF

;       MAIN SYSTEM LOOP

0158 DBE8            IN      LCTP            ;LOAD MAX PEAK FROM SW
        015A 32103C          STA     MAXPK           ;STORE IT
        015D 3E14            MVI     A,20            ;
        015F 32163C          STA     LMINA           ;MINA
        0162 3E78            MVI     A,120           ;
        0164 32173C          STA     LMAXB           ;MAXB
        0167 3E1E            MVI     A,30            ;
        0169 32183C          STA     LMCTS           ;LMCTS
        016C 3EFF            MVI     A,255           ;
        016E 32193C          STA     LXCTS           ;LXCTS
        0171 3E05            MVI     A,5             ;
        0173 32143C          STA     TOL1            ;TOL1
        0176 3E07            MVI     A,7             ;
        0178 321A3C          STA     LMINP           ;LMINP
```

```
       017B 3E5A              MVI    A,90
       017D 321B3C            STA    LMAXP         ;MAXP
                      BEGIN:                       ;START OF CONTROL CYCLE
                         +   SON    LITE2          ;ON WAITING FOR IX LITE

+;   SON    SBC-80/10 MACRO V.M=1.0
       0180 3A0A3C       +   LDA    XLTST         ;CURRENT LITE STATUS
       0183 F604         +   ORI    00004H        ;SET ON PROPER BIT
       0185 320A3C       +   STA    XLTST         ;STORE NEW STATUS
       0188 D3E9         +   OUT    LOIOP         ;SET THE LITE ON

IXWT:                        ;WAIT FOR INDEX LOOP
       018A DBE6            IN     INDX          ;LOOK AT PORT
       018C E640            ANI    01000000B     ;LOOK AT BIT 1
       018E CA8A01          JZ     IXWT          ;IF NOT THERE LOOP
                      ;
                      ;      RESET STATUS LITES....
                      ;
                         +   SOFF   LITE2
       0191 3A0A3C       +   LDA    XLTST         ;CURRENT LITE STATUS
       0194 F604         +   ORI    00004H        ;INSURE BIT ON
       0196 EE04         +   XRI    00004H        ;TURN OFF PROPER BIT
       0198 320A3C       +   STA    XLTST         ;STORE NEW STATUS
       019B D3E9         +   OUT    LOIOP         ;SET THE LITE OFF

+   SOFF   LITE3
       019D 3A0A3C       +   LDA    XLTST         ;CURRENT LITE STATUS
       01A0 F608         +   ORI    00008H        ;INSURE BIT ON
       01A2 EE08         +   XRI    00008H        ;TURN OFF PROPER BIT
       01A4 320A3C       +   STA    XLTST         ;STORE NEW STATUS
       01A7 D3E9         +   OUT    LOIOP         ;SET THE LITE OFF

+   SOFF   LITE4
       01A9 3A0A3C       +   LDA    XLTST         ;CURRENT LITE STATUS
       01AC F610         +   ORI    00010H        ;INSURE BIT ON
       01AE EE10         +   XRI    00010H        ;TURN OFF PROPER BIT
       01B0 320A3C       +   STA    XLTST         ;STORE NEW STATUS
       01B3 D3E9         +   OUT    LOIOP         ;SET THE LITE OFF

+   SOFF   LITE5
       01B5 3A0A3C       +   LDA    XLTST         ;CURRENT LITE STATUS
       01B8 F620         +   ORI    00020H        ;INSURE BIT ON
       01BA EE20         +   XRI    00020H        ;TURN OFF PROPER BIT
       01BC 320A3C       +   STA    XLTST         ;STORE NEW STATUS
       01BF D3E9         +   OUT    LOIOP         ;SET THE LITE OFF

+   SOFF   LITE6
       01C1 3A0A3C       +   LDA    XLTST         ;CURRENT LITE STATUS
       01C4 F640         +   ORI    00040H        ;INSURE BIT ON
       01C6 EE40         +   XRI    00040H        ;TURN OFF PROPER BIT
       01C8 320A3C       +   STA    XLTST         ;STORE NEW STATUS
       01CB D3E9         +   OUT    LOIOP         ;SET THE LITE OFF

+   SOFF   LITE7
       01CD 3A0A3C       +   LDA    XLTST         ;CURRENT LITE STATUS
       01D0 F680         +   ORI    00080H        ;INSURE BIT ON
       01D2 EE80         +   XRI    00080H        ;TURN OFF PROPER BIT
       01D4 320A3C       +   STA    XLTST         ;STORE NEW STATUS
       01D7 D3E9         +   OUT    LOIOP         ;SET THE LITE OFF

;
                      ;      SET STXIT FOR 4 SECONDS
                      ;
                         +   STXIT  TOUT,238
                         +;   STXIT  SBC-80/10 MACRO V.M=1.0
       FF12          +TIME   SET    65536-000EEH
       01D9 F3         +   DI                    ;DISABLE INTERRUPTS
                         +   SETSS
                         +;   SETSS  SBC-80/10 MACRO V.M=1.0
                         +   SAVE
                         +;   SAVE   SBC-80/10 MACRO V.M=1.0
       01DA F5         +   PUSH   PSW           ;SAVE A/FLAGS
       01DB C5         +   PUSH   B             ;SAVE B/C
       01DC D5         +   PUSH   D             ;SAVE D/E
```

```
01DD E5          +           PUSH    H                       ; SAVE H/L
                 +
01DE 210000      +           LXI     H,0                     ; ZERO H/L
01E1 39          +           DAD     SP                      ; PUT SP INTO H/L
01E2 22043C      +           SHLD    XSPSV                   ; SAVE CURRENT STACK POINTER
                 +
01E5 21E804      +           LXI     H,004E8H                ; LOAD STXIT JMP ADDR
01E8 22063C      +           SHLD    XITLA                   ; STORE IN SUPERVISOR
01EB 2112FF      +           LXI     H,TIME                  ; LOAD COMPL OF TIME
01EE 22003C      +           SHLD    XRTCT                   ; STORE IN TIMER
01F1 FB          +           EI                              ; ENABLE INTERRUPTS
                 ;
                 ;           CONTROL PROCESS....
                 ;
                             PROCT:                          ; INIT CONTROL PROCESS
                 +           SETIT   0                       ; SET INTERVAL
                 +;          SETIT   SBC-80/10 MACRO V. M=1.0
0000             +TIME       SET     00000H
01F2 F3          +           DI                              ; DISABLE INTERRUPTS
01F3 E5          +           PUSH    H                       ; SAVE H/L
01F4 210000      +           LXI     H,TIME                  ; LOAD TIMER VALUE
01F7 22023C      +           SHLD    XINTU                   ; SET TIMER
01FA E1          +           POP     H                       ; RESTORE H/L
01FB FB          +           EI                              ; ENABLE INTERRUPTS

01FC CDC804                  CALL    AON                     ; TURN AIR ON
                 IBL1:                                       ; INITIAL BLOW LOOP
01FF CD8003                  CALL    DPEAK                   ; GO TRY FOR A PEAK
                 +           IFSW    ANYSW,IBL2              ; CHECK FOR ERRORS
                 +;          IFSW    SBC-80/10 MACRO V. M=1.0
0202 3A0B3C      +           LDA     XSWCH                   ; LOAD SWITCH BLOCK
0205 E6FF        +           ANI     000FFH                  ; MASK TO PROPER BIT
0207 C25002      +           JNZ     00250H                  ; JUMP IF ON

020A CDD704                  CALL    AOFF                    ; TURN BLOW AIR OFF
                 +           MOVEB   PEAK,WKPK               ; SAVE THIS VALUE
                 +;          MOVEB   SBC-80/10 MACRO V. M=1.0
020D 3A0F3C      +           LDA     03C0FH                  ; LOAD BYTE INTO A
0210 32113C      +           STA     03C11H                  ; STORE BYTE IN MEM

+           SETIT   0                       ; RESET INTERVAL
                 +;          SETIT   SBC-80/10 MACRO V. M=1.0
0000             +TIME       SET     00000H
0213 F3          +           DI                              ; DISABLE INTERRUPTS
0214 E5          +           PUSH    H                       ; SAVE H/L
0215 210000      +           LXI     H,TIME                  ; LOAD TIMER VALUE
0218 22023C      +           SHLD    XINTU                   ; SET TIMER
021B E1          +           POP     H                       ; RESTORE H/L
021C FB          +           EI                              ; ENABLE INTERRUPTS

IBW1:                                       ; WAIT FOR INITIAL COAST
                 +           IFIT    4,IBWD                  ; WAIT LAPSED
                 +;          IFIT    SBC-80/10 MACRO V. M=1.0
FFFC             +TIME       SET     65536-00004H

021D F3          +           DI                              ; DISABLE INTERRUPTS
021E 2A023C      +           LHLD    XINTU                   ; LOAD TIMER
0221 01FCFF      +           LXI     B,TIME                  ; LOAD COMPL OF VALUE
0224 09          +           DAD     B                       ; ADD(SUBTRACT) VALUE
0225 FB          +           EI                              ; ENABLE INTERRUPTS
0226 DA2C02      +           JC      0022CH                  ; JUMP IF TIME LAPSED

0229 C31D02                  JMP     IBW1                    ; CONTINUE WAITITN
                 IBWD:                                       ; NOW COMPUTE COAST
022C CD8003                  CALL    DPEAK                   ; GO GET A NEW VALUE
                 +           IFSW    ANYSW,PROCT             ; IF ERROR NOW GO TRY AGAIN
                 +;          IFSW    SBC-80/10 MACRO V. M=1.0
022F 3A0B3C      +           LDA     XSWCH                   ; LOAD SWITCH BLOCK
0232 E6FF        +           ANI     000FFH                  ; MASK TO PROPER BIT
0234 C2F201      +           JNZ     001F2H                  ; JUMP IF ON

+           IFBLT   PEAK,WKPK,PROCT         ; IS PEAK ASCENDING
                 +;          IFBLT   SBC-80/10 MACRO V. M=1.0
0237 3A113C      +           LDA     03C11H                  ; LOAD BOPER INTO A
```

```
023A 47          +        MOV    B,A                      ;MOVE IT TO B
023B 3A0F3C      +        LDA    03C0FH                   ;LOAD AOPER INTO A
023E B8          +        CMP    B                        ;TEST A VS B
023F DAF201      +        JC     001F2H                   ;JUMP IF A LT B

+        SUBB   PEAK,WKPK,TOL1           ;COMPUTE COAST FOR TOLER
                 +;       SUBB   SBC-80/10 MACRO V. M=1.0
0242 3A113C      +        LDA    03C11H                   ;LOAD BOPER INTO A
0245 47          +        MOV    B,A                      ;MOVE IT TO B
0246 3A0F3C      +        LDA    03C0FH                   ;LOAD AOPER INTO A
0249 90          +        SUB    B                        ;SUB A-B
024A 32143C      +        STA    03C14H                   ;STORE RESULT

024D C36502               JMP    CTLP                     ;GO RATE CONTROL
                IBL2:                                     ;NO SIGNAL LOOP
                 +        IFIT   80,IBE1                  ;TOO MUCH TIME
                 +;       IFIT   SBC-80/10 MACRO V. M=1.0
FFB0            +TIME    SET    65536-00050H
0250 F3          +        DI                              ;DISABLE INTERRUPTS
0251 2A023C      +        LHLD   XINTU                    ;LOAD TIMER
0254 01B0FF      +        LXI    B,TIME                   ;LOAD COMPL OF VALUE
0257 09          +        DAD    B                        ;ADD(SUBTRACT) VALUE
0258 FB          +        EI                              ;ENABLE INTERRUPTS
0259 DA5F02      +        JC     0025FH                   ;JUMP IF TIME LAPSED

025C C3FF01               JMP    IBL1                     ;CONTINUE TRYING
                IBE1:                                     ;NO POSSIBLE CONTROL
025F CDD704               CALL   AOFF                     ;SHUT AIR OFF
0262 C36A03               JMP    ABND1                    ;ABEND PROCESS
                CTLP:                                     ;MAIN CONTROL PROCESS
0265 CD8003               CALL   DPEAK                    ;GO DEVELOP A PEAK

+        IFSW   ANYSW,CERR1              ;CHECK ERROR SWITCHES
                 +;       IFSW   SBC-80/10 MACRO V. M=1.0
0268 3A0B3C      +        LDA    XSWCH                    ;LOAD SWITCH BLOCK
026B E6FF        +        ANI    000FFH                   ;MASK TO PROPER BIT
026D C23D03      +        JNZ    0033DH                   ;JUMP IF ON

CLCMP:                                    ;START NEW CYCLE
                 +        MOVEB  MAXPK,WKPK               ;PUT MAX PEAK TO WORK
                 +;       MOVEB  SBC-80/10 MACRO V. M=1.0
0270 3A103C      +        LDA    03C10H                   ;LOAD BYTE INTO A
0273 32113C      +        STA    03C11H                   ;STORE BYTE IN MEM

0276 CD8003               CALL   DPEAK                    ;GO GET A PICTURE
                 +        IFSW   ANYSW,CERR1              ;CHECK FOR ERROR
                 +;       IFSW   SBC-80/10 MACRO V. M=1.0
0279 3A0B3C      +        LDA    XSWCH                    ;LOAD SWITCH BLOCK
027C E6FF        +        ANI    000FFH                   ;MASK TO PROPER BIT
027E C23D03      +        JNZ    0033DH                   ;JUMP IF ON

+        IFBLT  MAXPK,PEAK,IDONE         ;CHECK FOR OVER PEAK
                 +;       IFBLT  SBC-80/10 MACRO V. M=1.0
0281 3A0F3C      +        LDA    03C0FH                   ;LOAD BOPER INTO A
0284 47          +        MOV    B,A                      ;MOVE IT TO B
0285 3A103C      +        LDA    03C10H                   ;LOAD AOPER INTO A
0288 B8          +        CMP    B                        ;TEST A VS B
0289 DA3103      +        JC     00331H                   ;JUMP IF A LT B

+        SUBB   WKPK,PEAK,WKPK           ;WKPK=REMAINING
                 +;       SUBB   SBC-80/10 MACRO V. M=1.0
028C 3A0F3C      +        LDA    03C0FH                   ;LOAD BOPER INTO A
028F 47          +        MOV    B,A                      ;MOVE IT TO B
0290 3A113C      +        LDA    03C11H                   ;LOAD AOPER INTO A
0293 90          +        SUB    B                        ;SUB A-B
0294 32113C      +        STA    03C11H                   ;STORE RESULT

+        IFBGT  TOL1,WKPK,CLCDV          ;IF ONLY TOL1 LEFT THEN GO
                 +;       IFBGT  SBC-80/10 MACRO V. M=1.0
0297 3A113C      +        LDA    03C11H                   ;LOAD BOPER INTO A
029A 47          +        MOV    B,A                      ;MOVE IT TO B
029B 3A143C      +        LDA    03C14H                   ;LOAD AOPER INTO A
029E B8          +        CMP    B                        ;TEST A VS B
029F D2AD02      +        JNC    002ADH                   ;JUMP IF A GT B

+        SUBB   WKPK,TOL1,WKPK           ;REMAINING LESS COAST
```

```
                        +;       SUBB       SBC-80/10 MACRO V. M=1.0
   02A2  3A143C         +        LDA        03C14H            ;LOAD BOPER INTO A
   02A5  47             +        MOV        B,A               ;MOVE IT TO B
   02A6  3A113C         +        LDA        03C11H            ;LOAD AOPER INTO A
   02A9  90             +        SUB        B                 ;SUB A-B
   02AA  32113C         +        STA        03C11H            ;STORE RESULT
                        CLCDV:                                ;
                        +        IFBLT      WKPK,TWO,CLCAD    ;IF LESS THAN 2 THEN GO
                        +;       IFBLT      SBC-80/10 MACRO V. M=1.0
   02AD  3A0F05         +        LDA        0050FH            ;LOAD BOPER INTO A
   02B0  47             +        MOV        B,A               ;MOVE IT TO B
   02B1  3A113C         +        LDA        03C11H            ;LOAD AOPER INTO A
   02B4  B8             +        CMP        B                 ;TEST A VS B
   02B5  DAC102         +        JC         002C1H            ;JUMP IF A LT B

02B8  3A113C                  LDA        WKPK              ;LOAD WORK PEAK
   02BB  E6FE                    ANI        11111110B         ;INSURE LAST BIT OFF
   02BD  0F                      RRC                          ;DIVIDE BY 2
   02BE  32113C                  STA        WKPK              ;STORE IT
                        CLCAD:                                ;
                        +        ADDB       PEAK,WKPK,IWPK    ;SET UP INCREMENTAL VALUE
                        +;       ADDB       SBC-80/10 MACRO V. M=1.0
   02C1  3A0F3C         +        LDA        03C0FH            ;LOAD AOPER INTO A
   02C4  47             +        MOV        B,A               ;MOVE IT TO B
   02C5  3A113C         +        LDA        03C11H            ;LOAD BOPER INTO A
   02C8  80             +        ADD        B                 ;ADD A+B
   02C9  32123C         +        STA        03C12H            ;STORE RESULT

CLCEX:                                ;AIR ON AND GO
   02CC  CDC804                  CALL       AON               ;TURN AIR ON
                        CLCKP:                                ;WAIT FOR PEAK TO MAKE IT
   02CF  CD8003                  CALL       DPEAK             ;GO GET PEAK
                        +        IFSW       ANYSW,CERR2       ;A PICTURE ERROR
                        +;       IFSW       SBC-80/10 MACRO V. M=1.0
   02D2  3A0B3C         +        LDA        XSWCH             ;LOAD SWITCH BLOCK
   02D5  E6FF           +        ANI        000FFH            ;MASK TO PROPER BIT
   02D7  C26403         +        JNZ        00364H            ;JUMP IF ON
                        +        IFBLT      PEAK,IWPK,CLCKP   ;HIT INCREMEMT???
                        +;       IFBLT      SBC-80/10 MACRO V. M=1.0
   02DA  3A123C         +        LDA        03C12H            ;LOAD BOPER INTO A
   02DD  47             +        MOV        B,A               ;MOVE IT TO B
   02DE  3A0F3C         +        LDA        03C0FH            ;LOAD AOPER INTO A
   02E1  B8             +        CMP        B                 ;TEST A VS B
   02E2  DACF02         +        JC         002CFH            ;JUMP IF A LT B

02E5  CDD704                  CALL       AOFF              ;YES
                        +        MOVEB      PEAK,SVPK         ;SAVE THIS ONE
                        +;       MOVEB      SBC-80/10 MACRO V. M=1.0
   02E8  3A0F3C         +        LDA        03C0FH            ;LOAD BYTE INTO A
   02EB  32133C         +        STA        03C13H            ;STORE BYTE IN MEM

+        SETIT      0                 ;SET TIMER TO ZERO
                        +;       SETIT      SBC-80/10 MACRO V. M=1.0
   0000                 +TIME    SET        00000H
   02EE  F3             +        DI                           ;DISABLE INTERRUPTS
   02EF  E5             +        PUSH       H                 ;SAVE H/L
   02F0  210000         +        LXI        H,TIME            ;LOAD TIMER VALUE
   02F3  22023C         +        SHLD       XINTU             ;SET TIMER
   02F6  E1             +        POP        H                 ;RESTORE H/L
   02F7  FB             +        EI                           ;ENABLE INTERRUPTS

CLWT:                                 ;WAIT HERE FOR ...
                        +        IFIT       4,CLCLP           ;WAIT
                        +;       IFIT       SBC-80/10 MACRO V. M=1.0
   FFFC                 +TIME    SET        65536-00004H
   02F8  F3             +        DI                           ;DISABLE INTERRUPTS
   02F9  2A023C         +        LHLD       XINTU             ;LOAD TIMER
   02FC  01FCFF         +        LXI        B,TIME            ;LOAD COMPL OF VALUE
   02FF  09             +        DAD        B                 ;ADD(SUBTRACT) VALUE
   0300  FB             +        EI                           ;ENABLE INTERRUPTS
   0301  DA0703         +        JC         00307H            ;JUMP IF TIME LAPSED
```

```
0304 C3F802              JMP      CLWT              ;CONTINUE WAITITG
           CLCLP:                                    ;CHECK LOOP
0307 CD8003              CALL     DPEAK             ;GO GET ANOTHER PEAK
              +          IFSW     ANYSW,CERR1       ;OOPS
              +;         IFSW     SBC-80/10 MACRO V. M=1.0
030A 3A0B3C   +          LDA      XSWCH             ;LOAD SWITCH BLOCK
030D E6FF     +          ANI      000FFH            ;MASK TO PROPER BIT
030F C23D03   +          JNZ      0033DH            ;JUMP IF ON

+          IFBLT    PEAK,SVPK,CLCMP   ;NOT ASCENDING, ANOTHER OOPS
              +;         IFBLT    SBC-80/10 MACRO V. M=1.0
0312 3A133C   +          LDA      03C13H            ;LOAD BOPER INTO A
0315 47       +          MOV      B,A               ;MOVE IT TO B
0316 3A0F3C   +          LDA      03C0FH            ;LOAD AOPER INTO A
0319 B8       +          CMP      B                 ;TEST A VS B
031A DA7002   +          JC       00270H            ;JUMP IF A LT B

+          SUBB     PEAK,SVPK,TOL1    ;CREEP!!!!
              +;         SUBB     SBC-80/10 MACRO V. M=1.0
031D 3A133C   +          LDA      03C13H            ;LOAD BOPER INTO A
0320 47       +          MOV      B,A               ;MOVE IT TO B
0321 3A0F3C   +          LDA      03C0FH            ;LOAD AOPER INTO A
0324 90       +          SUB      B                 ;SUB A-B
0325 32143C   +          STA      03C14H            ;STORE RESULT

+          MOVEB    PEAK,SVPK         ;SAVE NEW VALUE
              +;         MOVEB    SBC-80/10 MACRO V. M=1.0
0328 3A0F3C   +          LDA      03C0FH            ;LOAD BYTE INTO A
032B 32133C   +          STA      03C13H            ;STORE BYTE IN MEM

032E C37002              JMP      CLCMP             ;CONTINUE
           IDONE:                                    ;ALL DONE DID

+          ENDIT
              +;         ENDIT    SBC-80/10 MACRO V. M=1.0
0331 F3       +          DI                         ;DISABLE ANY INTERRUPTS
              +          RSTSS                      ;RESTORE SYSTEM STATUS
              +;         RSTSS    SBC-80/10 MACRO V. M=1.0
0332 2A043C   +          LHLD     XSPSV             ;LOAD SAVED STACK POINTER
0335 F9       +          SPHL                       ;PUT IN STACK POINTER
              +          REST
              +;         REST     SBC-80/10 MACRO V. M=1.0
0336 E1       +          POP      H                 ;RESTORE H/L
0337 D1       +          POP      D                 ;RESTORE D/E
0338 C1       +          POP      B                 ;RESTORE B/C
0339 F1       +          POP      PSW               ;RESTORE A/FLAGS

033A C38001              JMP      BEGIN             ;GO SET FOR NEXT CYCLE
           CERR1:                                    ;ERROR 1
              +          SETIT    0                 ;SET INTERVAL
              +;         SETIT    SBC-80/10 MACRO V. M=1.0
0000         +TIME       SET      00000H
033D F3       +          DI                         ;DISABLE INTERRUPTS
033E E5       +          PUSH     H                 ;SAVE H/L
033F 210000   +          LXI      H,TIME            ;LOAD TIMER VALUE
0342 22023C   +          SHLD     XINTU             ;SET TIMER
0345 E1       +          POP      H                 ;RESTORE H/L
0346 FB       +          EI                         ;ENABLE INTERRUPTS

CERLO:                                    ;TRY LOOP
0347 CD8003              CALL     DPEAK             ;GO TRY ANOTHER
              +          IFSW     ANYSW,CERL1       ;NOT YET
              +;         IFSW     SBC-80/10 MACRO V. M=1.0
034A 3A0B3C   +          LDA      XSWCH             ;LOAD SWITCH BLOCK
034D E6FF     +          ANI      000FFH            ;MASK TO PROPER BIT
034F C25503   +          JNZ      00355H            ;JUMP IF ON

0352 C37002              JMP      CLCMP             ;GO CONTUNIE
           CERL1:                                    ;CHECK FOR TOO MUCH TIME
              +          IFIT     20,ABND1          ;TOO MUCH
              +;         IFIT     SBC-80/10 MACRO V. M=1.0
FFEC         +TIME       SET      65536-00014H
0355 F3       +          DI                         ;DISABLE INTERRUPTS
0356 2A023C   +          LHLD     XINTU             ;LOAD TIMER
```

```
0359 01ECFF    +        LXI     B, TIME         ;LOAD COMPL OF VALUE
035C 09        +        DAD     B               ;ADD(SUBTRACT) VALUE
035D FB        +        EI                      ;ENABLE INTERRUPTS
035E DA6A03    +        JC      0036AH          ;JUMP IF TIME LAPSED

0361 C34703             JMP     CERL0           ;CONTINUE TRYING
                CERR2:                          ;ERROR 2

0364 CDD704             CALL    AOFF            ;SHUT AIR OFF
0367 C33D03             JMP     CERR1           ;GO HANDLE AS ERROR 1
                ABND1:                          ;ABORT PROCESS
               +        SON     LITE5           ;ON ERROR LITE

+;       SON     SBC-80/10 MACRO V. M=1.0
036A 3A0A3C    +        LDA     XLTST           ;CURRENT LITE STATUS
036D F620      +        ORI     00020H          ;SET ON PROPER BIT
036F 320A3C    +        STA     XLTST           ;STORE NEW STATUS
0372 D3E9      +        OUT     LOIOP           ;SET THE LITE ON

+        ENDIT                   ;RESET SYSTEM
               +;       ENDIT   SBC-80/10 MACRO V. M=1.0
0374 F3        +        DI                      ;DISABLE ANY INTERRUPTS
               +        RSTSS                   ;RESTORE SYSTEM STATUS
               +;       RSTSS   SBC-80/10 MACRO V. M=1.0
0375 2A043C    +        LHLD    XSPSV           ;LOAD SAVED STACK POINTER
0378 F9        +        SPHL                    ;PUT IN STACK POINTER
               +        REST
               +;       REST    SBC-80/10 MACRO V. M=1.0
0379 E1        +        POP     H               ;RESTORE H/L
037A D1        +        POP     D               ;RESTORE D/E
037B C1        +        POP     B               ;RESTORE B/C
037C F1        +        POP     PSW             ;RESTORE A/FLAGS
               +
               +

037D C38001             JMP     BEGIN           ;GO RESTART

;       DEVELOP PEAK DIFF FROM A & B COUNTS.
                ;
                DPEAK:                          ;DO IT
               +        RESSW   ALLSW           ;RESET ALL SWITCHES
               +;       RESSW   SBC-80/10 MACRO V. M=1.0
0380 3A0B3C    +        LDA     XSWCH           ;LOAD SWITCH BLOCK
0383 F6FF      +        ORI     000FFH          ;INSURE ON
0385 EEFF      +        XRI     000FFH          ;COMPLIMENT
0387 320B3C    +        STA     XSWCH           ;RESTORE SWITCH BLOCK

038A CD1104             CALL    LDCTS           ;LOAD COUNTS
               +        IFBLT   MINA,LMINA,DERR1    ;MINA LT LIMIT
               +;       IFBLT   SBC-80/10 MACRO V. M=1.0
038D 3A163C    +        LDA     03C16H          ;LOAD BOPER INTO A
0390 47        +        MOV     B,A             ;MOVE IT TO B
0391 3A0C3C    +        LDA     03C0CH          ;LOAD AOPER INTO A
0394 B8        +        CMP     B               ;TEST A VS B
0395 DADB03    +        JC      003DBH          ;JUMP IF A LT B

+        IFBGT   MAXB,LMAXB,DERR2    ;MAXB GT LIMIT
               +;       IFBGT   SBC-80/10 MACRO V. M=1.0
0398 3A173C    +        LDA     03C17H          ;LOAD BOPER INTO A
039B 47        +        MOV     B,A             ;MOVE IT TO B
039C 3A0D3C    +        LDA     03C0DH          ;LOAD AOPER INTO A
039F B8        +        CMP     B               ;TEST A VS B
03A0 D2E403    +        JNC     003E4H          ;JUMP IF A GT B

+        IFBLT   NCTS,LMCTS,DERR3    ;NCTS LT LIMIT
               +;       IFBLT   SBC-80/10 MACRO V. M=1.0
03A3 3A183C    +        LDA     03C18H          ;LOAD BOPER INTO A
03A6 47        +        MOV     B,A             ;MOVE IT TO B
03A7 3A0E3C    +        LDA     03C0EH          ;LOAD AOPER INTO A
03AA B8        +        CMP     B               ;TEST A VS B
03AB DAED03    +        JC      003EDH          ;JUMP IF A LT B

+        IFBGT   NCTS,LXCTS,DERR4    ;NCTS GT LIMIT
               +;       IFBGT   SBC-80/10 MACRO V. M=1.0
03AE 3A193C    +        LDA     03C19H          ;LOAD BOPER INTO A
```

```
 03B1 47      +           MOV    B,A                       ;MOVE IT TO B
 03B2 3A0E3C  +           LDA    03C0EH                    ;LOAD AOPER INTO A
 03B5 B8      +           CMP    B                         ;TEST A VS B
 03B6 D2F603  +           JNC    003F6H                    ;JUMP IF A GT B

+           SUBB   MAXB,MINA,PEAK            ;PUT PEAK INTO MEM
              +;          SUBB   SBC-80/10 MACRO V. M=1.0
 03B9 3A0C3C  +           LDA    03C0CH                    ;LOAD BOPER INTO A
 03BC 47      +           MOV    B,A                       ;MOVE IT TO B
 03BD 3A0D3C  +           LDA    03C0DH                    ;LOAD AOPER INTO A
 03C0 90      +           SUB    B                         ;SUB A-B
 03C1 320F3C  +           STA    03C0FH                    ;STORE RESULT

+           IFBLT  PEAK,LMINP,DERR5          ;PEAK LT LIMIT
              +;          IFBLT  SBC-80/10 MACRO V. M=1.0
 03C4 3A1A3C  +           LDA    03C1AH                    ;LOAD BOPER INTO A
 03C7 47      +           MOV    B,A                       ;MOVE IT TO B
 03C8 3A0F3C  +           LDA    03C0FH                    ;LOAD AOPER INTO A
 03CB B8      +           CMP    B                         ;TEST A VS B
 03CC DAFF03  +           JC     003FFH                    ;JUMP IF A LT B

+           IFBGT  PEAK,LMAXP,DERR6          ;PEAK GT LIMIT
              +;          IFBGT  SBC-80/10 MACRO V. M=1.0
 03CF 3A1B3C  +           LDA    03C1BH                    ;LOAD BOPER INTO A
 03D2 47      +           MOV    B,A                       ;MOVE IT TO B
 03D3 3A0F3C  +           LDA    03C0FH                    ;LOAD AOPER INTO A
 03D6 B8      +           CMP    B                         ;TEST A VS B
 03D7 D20804  +           JNC    00408H                    ;JUMP IF A GT B

03DA C9                  RET                              ;GOOD PEAK
              DERR1:                                       ;MINA LT LIMIT
              +           SETSW  SW1                       ;ON SW1
              +;          SETSW  SBC-80/10 MACRO V. M=1.0
 03DB 3A0B3C  +           LDA    XSWCH                     ;LOAD SWITCH BLOCK
 03DE F601    +           ORI    00001H                    ;TURN BIT ON
 03E0 320B3C  +           STA    XSWCH                     ;RESTORE SWITCH BLOCK

03E3 C9                  RET                              ;RETURN
              DERR2:                                       ;MAXB GT LIMIT
              +           SETSW  SW2                       ;ON SW2
              +;          SETSW  SBC-80/10 MACRO V. M=1.0
 03E4 3A0B3C  +           LDA    XSWCH                     ;LOAD SWITCH BLOCK
 03E7 F602    +           ORI    00002H                    ;TURN BIT ON
 03E9 320B3C  +           STA    XSWCH                     ;RESTORE SWITCH BLOCK

03EC C9                  RET                              ;RETURN
              DERR3:                                       ;NCTS LT LIMIT
              +           SETSW  SW3                       ;ON SW3
              +;          SETSW  SBC-80/10 MACRO V. M=1.0
 03ED 3A0B3C  +           LDA    XSWCH                     ;LOAD SWITCH BLOCK
 03F0 F604    +           ORI    00004H                    ;TURN BIT ON
 03F2 320B3C  +           STA    XSWCH                     ;RESTORE SWITCH BLOCK

03F5 C9                  RET                              ;RETURN
              DERR4:                                       ;NCTS GT LIMIT
              +           SETSW  SW4                       ;ON SW4
              +;          SETSW  SBC-80/10 MACRO V. M=1.0
 03F6 3A0B3C  +           LDA    XSWCH                     ;LOAD SWITCH BLOCK
 03F9 F608    +           ORI    00008H                    ;TURN BIT ON
 03FB 320B3C  +           STA    XSWCH                     ;RESTORE SWITCH BLOCK

03FE C9                  RET                              ;RETURN
              DERR5:                                       ;PEAK GT LIMIT
              +           SETSW  SW5                       ;ON SW5
              +;          SETSW  SBC-80/10 MACRO V. M=1.0
 03FF 3A0B3C  +           LDA    XSWCH                     ;LOAD SWITCH BLOCK
 0402 F610    +           ORI    00010H                    ;TURN BIT ON
 0404 320B3C  +           STA    XSWCH                     ;RESTORE SWITCH BLOCK

0407 C9                  RET                              ;RETURN
              DERR6:                                       ;PEAK GT LIMIT
              +           SETSW  SW6                       ;ON SW6
              +;          SETSW  SBC-80/10 MACRO V. M=1.0
 0408 3A0B3C  +           LDA    XSWCH                     ;LOAD SWITCH BLOCK
```

```
 040B F620      +           ORI      00020H              ;TURN BIT ON
 040D 320B3C    +           STA      XSWCH               ;RESTORE SWITCH BLOCK

0410 C9                    RET                          ;RETURN
                        ;
                        ;       LOAD A AND B COUNTS
                        ;
                  LDCTS:                                 ;LOAD COUNTS
 0411 210000               LXI      H,0                  ;ZERO H/L 0414 39                   DAD      SP                   ;PUT SP IN H/L
 0415 221D3C               SHLD     SAVSP                ;SAVE STACK POINTER
                           SON      LITE3                ;ON VIDEO LITE

+;         SON      SBC-80/10 MACRO V. M=1.0
 0418 3A0A3C    +          LDA      XLTST                ;CURRENT LITE STATUS
 041B F608      +          ORI      00008H               ;SET ON PROPER BIT
 041D 320A3C    +          STA      XLTST                ;STORE NEW STATUS
 0420 D3E9      +          OUT      LOIOP                ;SET THE LITE ON 0422 1E00                 MVI      E,0                  ;ZERO NUMBER COUNTER
                           SETIT    0                    ;SET IT AT ZERO
                +;         SETIT    SBC-80/10 MACRO V. M=1.0
 0000           +TIME      SET      00000H
 0424 F3        +          DI                            ;DISABLE INTERRUPTS
 0425 E5        +          PUSH     H                    ;SAVE H/L
 0426 210000    +          LXI      H,TIME               ;LOAD TIMER VALUE
 0429 22023C    +          SHLD     XINTU                ;SET TIMER
 042C E1        +          POP      H                    ;RESTORE H/L
 042D FB        +          EI                            ;ENABLE INTERRUPTS

SWAIT:                                 ;WAIT FOR SYNC
                +          IFIT     1,STWT0              ;IF SYNC CNTU, ELSE LOOP
                +;         IFIT     SBC-80/10 MACRO V. M=1.0
 FFFF           +TIME      SET      65536-00001H
 042E F3        +          DI                            ;DISABLE INTERRUPTS
 042F 2A023C    +          LHLD     XINTU                ;LOAD TIMER
 0432 01FFFF    +          LXI      B,TIME               ;LOAD COMPL OF VALUE
 0435 09        +          DAD      B                    ;ADD(SUBTRACT) VALUE
 0436 FB        +          EI                            ;ENABLE INTERRUPTS
 0437 DA3D04    +          JC       0043DH               ;JUMP IF TIME LAPSED

043A C32E04               JMP      SWAIT                ;LOOP
                  STWT0:                                 ;ENTRY POINT
 043D 1680                 MVI      D,10000000B          ;MASK
                  STWT1:                                 ;WAIT FOR CORRECT STATUS
 043F DBE6                 IN       SIOP                 ;LOAD STATUS
 0441 47                   MOV      B,A                  ;SAVE STATUS
 0442 A2                   ANA      D                    ;LOOK FOR WINDOW AND IBFA
 0443 AA                   XRA      D                    ;COMPLIMENT
 0444 C23F04               JNZ      STWT1                ;NOT THERE, GO LOOP
                  READA:                                 ;READ A COUNT
 0447 DBE4                 IN       ACTS                 ;READ IT
 0449 67                   MOV      H,A                  ;STORE IT
 044A DBE5                 IN       BCTS                 ;READ B COUNT
 044C 6F                   MOV      L,A                  ;SAVE B COUNT
 044D 78                   MOV      A,B                  ;RESTORE STATUS
 044E E622                 ANI      00100010B            ;LOOK AT IBFA & IBFB
 0450 EE22                 XRI      00100010B            ;MASK THOSE OUT
 0452 C25704               JNZ      STWT3                ;GO WAIT FOR NEXT

0455 E5                   PUSH     H                    ;STACK A & B COUNTS
 0456 1C                   INR      E                    ;ADD 1 TO NUMBER OF COUNTS
                  STWT3:                                 ;CHECK FOR SYNC
                +          IFIT     2,LDCTD              ;IF ANOTHER SYNC DONE
                +;         IFIT     SBC-80/10 MACRO V. M=1.0
 FFFE           +TIME      SET      65536-00002H
 0457 F3        +          DI                            ;DISABLE INTERRUPTS
 0458 2A023C    +          LHLD     XINTU                ;LOAD TIMER
 045B 01FEFF    +          LXI      B,TIME               ;LOAD COMPL OF VALUE
 045E 09        +          DAD      B                    ;ADD(SUBTRACT) VALUE
 045F FB        +          EI                            ;ENABLE INTERRUPTS
 0460 DA6604    +          JC       00466H               ;JUMP IF TIME LAPSED

0463 C32E04               JMP      SWAIT0               ;GO GET ANOTHER
```

```
         LDCTD:                          ; COUNTS LOADED
0466 7B         MOV     A,E              ; PUT COUNT IN A
0467 FE08       CPI     8                ; COMPARE TO 8
0469 CAAA04     JZ      LDER1            ; EQUAL 8 INVALID
046C DAAA04     JC      LDER1            ; LESS THAN 8 INVALID
046F D1         POP     D                ; SKIP THE
0470 D1         POP     D                ; FIRST
0471 D1         POP     D                ; FOUR
0472 D1         POP     D                ; COUNTS
0473 D608       SUI     8                ; SUBTRACT 8 FROM NO
0475 6F         MOV     L,A              ; PUT COUNTS INTO L
0476 320E3C     STA     NCTS             ; STORE COUNTS
0479 06FF       MVI     B,0FFH           ; TO FIND MIN OF A
047B 0E00       MVI     C,000H           ; TO FIND MAX IF B
         FMIMX:                          ; FIND MIN MAX LOOP
047D D1         POP     D                ; D=ACNT,C=BCNT
047E 78         MOV     A,B              ; A=LAST MIN A
047F BA         CMP     D                ; ACNT. VS. MIN A
0480 DA8404     JC      TMAXB            ; .GT.
0483 42         MOV     B,D              ; NEW MIN A
         TMAXB:                          ; TEST FOR MAX B
0484 79         MOV     A,C              ; A=LAST MAX B
0485 BB         CMP     E                ; BCNT. VS. MAX B
0486 D28A04     JNC     INCRL            ; .LT.
0489 4B         MOV     C,E              ; NEW MAX B
         INCRL:
048A 2D         DCR     L                ; COUNT-1
048B CA9104     JZ      LDCTX            ; ALL DONE
048E C37D04     JMP     FMIMX            ; GO LOOP
         LDCTX:                          ; LOAD COUNTS EXIT
0491 D1         POP     D                ; SKIP FOURTH FROM LAST
0492 D1         POP     D                ; SKIP THIRD FROM LAST
0493 D1         POP     D                ; SKIP NEXT TO LAST
0494 D1         POP     D                ; SKIP LAST
0495 78         MOV     A,B              ; A=MIN A
0496 320C3C     STA     MINA             ; STORE IT
0499 79         MOV     A,C              ; A=MAX B
049A 320D3C     STA     MAXB             ; STORE IT
         LDCRT:                          ; RETURN EXIT
       + SOFF    LITE3                   ; OFF VIDEO LITE
049D 3A0A3C  +  LDA     XLTST            ; CURRENT LITE STATUS
04A0 F608   +   ORI     00008H           ; INSURE BIT ON
04A2 EE08   +   XRI     00008H           ; TURN OFF PROPER BIT
04A4 320A3C +   STA     XLTST            ; STORE NEW STATUS
04A7 D3E9   +   OUT     LOIOP            ; SET THE LITE OFF
04A9 C9         RET                      ; RETURN
         LDER1:                          ; ERROR DURING LOAD COUNTS
04AA AF         XRA     A                ; ZERO A
04AB 320E3C     STA     NCTS             ; ZERO NCTS
04AE 320C3C     STA     MINA             ; ZERO MINA
04B1 3EFF       MVI     A,0FFH           ; A=255
04B3 320D3C     STA     MAXB             ; SET MAXB
04B6 2A1B3C     LHLD    SAVSP            ; LOAD SAVED SP
04B9 F9         SPHL                     ; RESET STACK POINTER
04BA C39D04     JMP     LDCRT            ; GO RETURN
         LDER2:                          ; ONLY ONE COUNT
04BD C3AA04     JMP     LDER1            ; GO HANDLE
         LDER3:                          ; ONLY TWO COUNTS
04C0 D1         POP     D                ; RESET SP
04C1 C3AA04     JMP     LDER1            ; GO HANDLE AS ERR1
         LDER4:                          ; ONLY THREE COUNTS
04C4 D1         POP     D                ; RESET SP
04C5 C3C004     JMP     LDER3            ; GO HANDLE AS ERR3
         ;
         ;               TURN ON CONTROL AIR
         ;
         AON:                            ; ON CONTROL AIT
       + SON     LITE4                   ; ON BLOW LITE
      +; SON     SBC-80/10 MACRO V.M=1.0
04C8 3A0A3C +   LDA     XLTST            ; CURRENT LITE STATUS
04CB F610   +   ORI     00010H           ; SET ON PROPER BIT
04CD 320A3C +   STA     XLTST            ; STORE NEW STATUS
04D0 D3E9   +   OUT     LOIOP            ; SET THE LITE ON
```

```
04D2 3E80             MVI    A,10000000B      ;SET ON BIT 7
04D4 D3EA             OUT    BAIR             ;PUT IT
04D6 C9               RET                     ;RETURN
                ;
                ;      TURN OFF CONTOL AIR
                ;
               AOFF:                          ;OFF CONTROL AIR
04B7 3E00             MVI    A,00000000B      ;ALL BITS OFF
04D9 D3EA             OUT    BAIR             ;PUT IT
             +        SOFF   LITE4            ;OFF BLOW LITE

04DB 3A0A3C  +        LDA    XLTST            ;CURRENT LITE STATUS
04DE F610    +        ORI    00010H           ;INSURE BIT ON
04E0 EE10    +        XRI    00010H           ;TURN OFF PROPER BIT
04E2 320A3C  +        STA    XLTST            ;STORE NEW STATUS
04E5 D3E9    +        OUT    LOIOP            ;SET THE LITE OFF

04E7 C9               RET                     ;RETURN
                ;
                ;     PROCESS HAS TIMED OUT
                ;
               TOUT:                          ;4 SECONDS ELAPSED
             +        SON    LITE7            ;ON TIMEOUT LITE

+;       SON    SBC-80/10 MACRO V. M=1.0
04E8 3A0A3C  +        LDA    XLTST            ;CURRENT LITE STATUS
04EB F680    +        ORI    00080H           ;SET ON PROPER BIT
04ED 320A3C  +        STA    XLTST            ;STORE NEW STATUS
04F0 D3E9    +        OUT    LOIOP            ;SET THE LITE ON

+        ENDIT                   ;RESET ALL REGS ETC
             +;       ENDIT  SBC-80/10 MACRO V. M=1.0
04F2 F3      +        DI                      ;DISABLE ANY INTERRUPTS
             +        RSTSS                   ;RESTORE SYSTEM STATUS
             +;       RSTSS  SBC-80/10 MACRO V. M=1.0
04F3 2A043C  +        LHLD   XSPSV            ;LOAD SAVED STACK POINTER
04F6 F9      +        SPHL                    ;PUT IN STACK POINTER
             +        REST
             +;       REST   SBC-80/10 MACRO V. M=1.0
04F7 E1      +        POP    H                ;RESTORE H/L
04F8 D1      +        POP    D                ;RESTORE D/E
04F9 C1      +        POP    B                ;RESTORE B/C
04FA F1      +        POP    PSW              ;RESTORE A/FLAGS

04FB CDD704           CALL   AOFF             ;INSURE AIR OFF
04FE C38001           JMP    BEGIN            ;GO FOR ANOTHER
                ;
                ;
                ;     PROGRAM WORK AREAS....
                ;
0501 454E444F PGMID:  DB     'ENDOPN'         ;PROGRAM ID
0505 504E
0507 3730             DB     '70'             ;VERSION=7.0
0509 30313036         DB     '010677'         ;LAST ASSEMBLY DATE
050D 3737
050F 02       TWO:    DB     2                ;CONSTANT 2
3C0C                  ORG    CURAM
                ;
3C0C 00       MINA:   DB     0                ;MINIMUM A COUNT
3C0D 00       MAXB:   DB     0                ;MAXIMUM B COUNT
3C0E 00       NCTS:   DB     0                ;NUMBER OF COUNTS LOADED
3C0F 00       PEAK:   DB     0                ;STORAKE FOR PEAK
3C10 3C       MAXPK:  DB     60               ;MAX PEAK
3C11 00       WKPK:   DB     0                ;WORKING PEAK
3C12 00       IWPK:   DB     0                ;INCREMENTAL PEAK
3C13 00       SVPK:   DB     0                ;WORK AREA
3C14 04       TOL1:   DB     4                ;TOLERANCE
3C15 04       TOL2:   DB     4                ;TOL
                ;
                ;
                ;
```

```
3C16 00        LMINA:  DB   0        ; ABS MIN VALUE FOR MINA
3C17 FF        LMAXB:  DB   255      ; ABS MAX VALUE FOR MAXA
3C18 14        LMCTS:  DB   20       ; ABS MIN VALUE FOR NCTS
3C19 64        LXCTS:  DB   100      ; ABS MAX VALUE FOR NCTS
3C1A 0A        LMINP:  DB   10       ; ABS MIN VALUE FOR PEAK
3C1B 77        LMAXP:  DB   119      ; ABS MAX VALUE FOR PEAK
3C1C 05        LCHDI:  DB   5        ; VALUE WHICH SET TOL FOR DRIFT
3C1D 0000      SAVSP:  DW   0        ; SAVE AREA FOR SP
0000                   END   START
```

```
ABND1 036A    ACTS  00E4    ADDB  E968    ALLSW 00FF
ANYSW 00FF    AOFF  04D7    AON   04C8    BAIR  00EA
BCTS  00E5    BEGIN 0180    BGNSU 0040    BIOCW 0091
BITSA 0008    BITSB 0004    CAIR  00EA    CERL0 0347
CERL1 0355    CERR1 033B    CERR2 0364    CIIOP 00EE
CLCAD 02C1    CLCDV 02AD    CLCEX 02CC    CLCKP 02CF
CLCLP 0307    CLCMP 0270    CLWT  02F8    CNBRD 0002
CNCTW 0027    CNIOP 00ED    CNMDW 00CF    CNRDY 0001
COIOP 00EC    CR    000D    CTLP  0265    CUADD 00E8
CURAM 3C0C    DERR1 03DB    DERR2 03E4    DERR3 03ED
DERR4 03F6    DERR5 03FF    DERR6 0408    DPEAK 0380
ENDIT F0C4    FMIMX 047D    HALT  F047    IBE1  025F
IBL1  01FF    IBL2  0250    IBW1  021D    IBWD  022C
IDONE 0331    IFBEG EB4D    IFBGT EAA8    IFBLT EA05
IFIT  F595    IFSW  EC4B    INCRL 048A    INDX  00E6
IOPC1 00E7    IOPC2 00EB    IOPC3 00ED    IOPE4 00E4
IOPE5 00E5    IOPE6 00E6    IOPE7 00E7    IOPE8 00E8
IOPE9 00E9    IOPEA 00EA    IOPEB 00EB    IOPEC 00EC
IOPED 00ED    IOPEE 00EE    IOPEF 00EF    IWPK  3C12
IXWT  018A    LCHDI 3C1C    LCTP  00E8    LDCRT 049D
LDCTD 0466    LDCTS 0411    LDCTX 0491    LDER1 04AA
LDER2 04BD    LDER3 04C0    LDER4 04C4    LF    000A
LITE0 0001    LITE1 0002    LITE2 0004    LITE3 0008
LITE4 0010    LITE5 0020    LITE6 0040    LITE7 0080
LMAXB 3C17    LMAXP 3C1B    LMCTS 3C18    LMINA 3C16
LMINP 3C1A    LOIOP 00E9    LTIOP 00EB    LTMDW 0080
LXCTS 3C19    MAXB  3C0D    MAXPK 3C10    MINA  3C0C
MOVEB EBF0    NCTS  3C0E    NDRAM 3FFF    ONE   0001
PEAK  3C0F    PGMID 0501    PROCT 01F2    PTYM  007F
READA 0447    RESSW ECC1    REST  EFC6    RESTA 0000
RETIT F18F    RST0  0000    RST1  0008    RST2  0010
RST3  0018    RST4  0020    RST5  0028    RST6  0030
RST7  0038    RSTSW F49E    SAVE  F740    SAVSP 3C1D
SETIT F678    SETSS F510    SETSW ED51    SIOP  00E6
SOFF  EDCE    SON   EECB    START 0000    STBIN 00BE
STIT  F128    STRAM 3C00    STWT0 043D    STWT1 043F
STWT3 0457    STXIT F3A8    SUBB  E8CB    SVPK  3C13
SW1   0001    SW2   0002    SW3   0004    SW4   0008
SW5   0010    SW6   0020    SW7   0040    SW8   0080
SWAIT 042E    TMAXB 0484    TOL1  3C14    TOL2  3C15
TOUT  04E8    TWO   050F    WAIT  F1D2    WKPK  3C11
XCI   00B7    XC0   0099    XERR0 0042    XI1   0004
XI2   000B    XI3   0013    XI4   001B    XI5   0023
XI6   002B    XI7   0033    XINIT 004E    XINTU 3C02
XITCP 006C    XITER 0094    XITEX 008C    XITLA 3C06
XITSR 3C08    XLTST 3C0A    XPGID 0040    XPMC0 00AD
XRMCD 00E2    XRMCI 00C3    XRMCL 00CF    XRTCT 3C00
XRUN  00E8    XSPSV 3C04    XSUBG 003B    XSWCH 3C0B
XTCN  00A4    ZERO  0000
```

TIME FF12

TIME 0000

TIME 0000

TIME FFFC

TIME FFB0

TIME 0000

```
- TIME - FFFC
- TIME - 0000
- TIME - FFEC
- TIME - 0000
- TIME - FFFF
- TIME - FFFE
```

The invention disclosed and claimed herein is not limited to the specific mechanism and techniques herein shown and described since modification will undoubtedly occur to those skilled in the art. Hence, departures may be made from the form of the instant invention without departing from the principles thereof.

What we claim is:

1. Apparatus for automatically, iteratively controlling in real time the growth of a blister in a heated, hollow glass rod in response to a controlled supply of air comprising:
    (a) a TV camera for producing video images of said blister both when said supply of air is turned off and when growth of said blister has ceased;
    (b) interface means connected to said camera for detecting the leading and trailing edges of said blister by analyzing said video images and for generating sets of digital numbers corresponding to said leading and trailing edges both when said air supply is turned off and when said growth of said blister has ceased;
    (c) programmable digital processor means connected to said interface means for analyzing said sets of digital numbers to determine the size of said blister, both when said air supply is turned off and when the growth of said blister has ceased, for computing the coast associated with the formation of said blister, for comparing the size of said blister when growth has ceased and said coast with a target blister size, and for producing a control signal based upon the result of said comparison; and
    (d) control means connected to said processor means for controlling the air supplied to said blister in accordance with said control signal to iteratively control in real time the growth of said blister.

2. Apparatus according to claim 1 wherein the size of the blister is determined by computing the minimum value of the digital number corresponding to the leading edge of said blister and the maximum value of the digital number corresponding to the trailing edge of said blister and determining the difference therebetween.

3. Apparatus according to claim 1 wherein the coast is computed by determining the difference between the size of said blister when the air supply is turned off and the size of said blister when growth of said blister has ceased.

4. Apparatus according to claim 1 wherein said interface means includes:
    a digital counter;
    first and second comparator means for detecting said leading and trailing edges; and
    gating means connected to the output of said counter and to the outputs of said first and second comparator means for transmitting to said processor means the output of said counter upon detection of said leading and trailing edges by said first and second comparators.

5. A real time method for automatically, iteratively controlling the growth of a blister in a heated, hollow glass rod in response to a controlled supply of air comprising the steps of:
    (a) forming video images of said blister both when said supply of air is turned off and when growth of said blister has ceased;
    (b) detecting the leading and trailing edges of said blister by analyzing said video images both when said air supply is turned off and when said growth of said blister has ceased;
    (c) generating sets of digital numbers corresponding to said leading and trailing edges;
    (d) determining the size of said blister both when said air supply is turned off and when the growth of said blister has ceased;
    (e) computing the coast associated with the growth of said blister;
    (f) comparing the size of said blister when growth has ceased and said coast with a target blister size;
    (g) iteratively controlling the formation of said blister based upon the result of said comparison.

6. The method according to claim 5 wherein said detecting step includes the steps of:
    comparing said video image with a first reference voltage to determine said leading edge; and
    comparing said video image with a second reference voltage to determine said trailing edge.

7. The method according to claim 6 wherein said generating step includes the step of:
    initiating a digital counter at the start of a horizontal scan;
    gating the counter output upon detection of said leading edge; and
    gating the counter output again upon detection of said trailing edge.

8. The method according to claim 5 wherein said step of determining the size of said blister comprises the steps of:
    determining the minimum value of the digital number corresponding to the leading edge of said blister;
    determining the maximum value of the digital number corresponding to the trailing edge of said blister; and
    computing the difference between said minimum and maximum values.

9. The method according to claim 5 wherein said step of computing said coast comprises determining the difference between the size of said blister when the air supply is turned off and the size of said blister when growth of said blister has ceased.

* * * * *